Oct. 4, 1960
L. E. EDWARDS
2,955,261
AUDIO AMPLIFIER
Filed Dec. 3, 1956
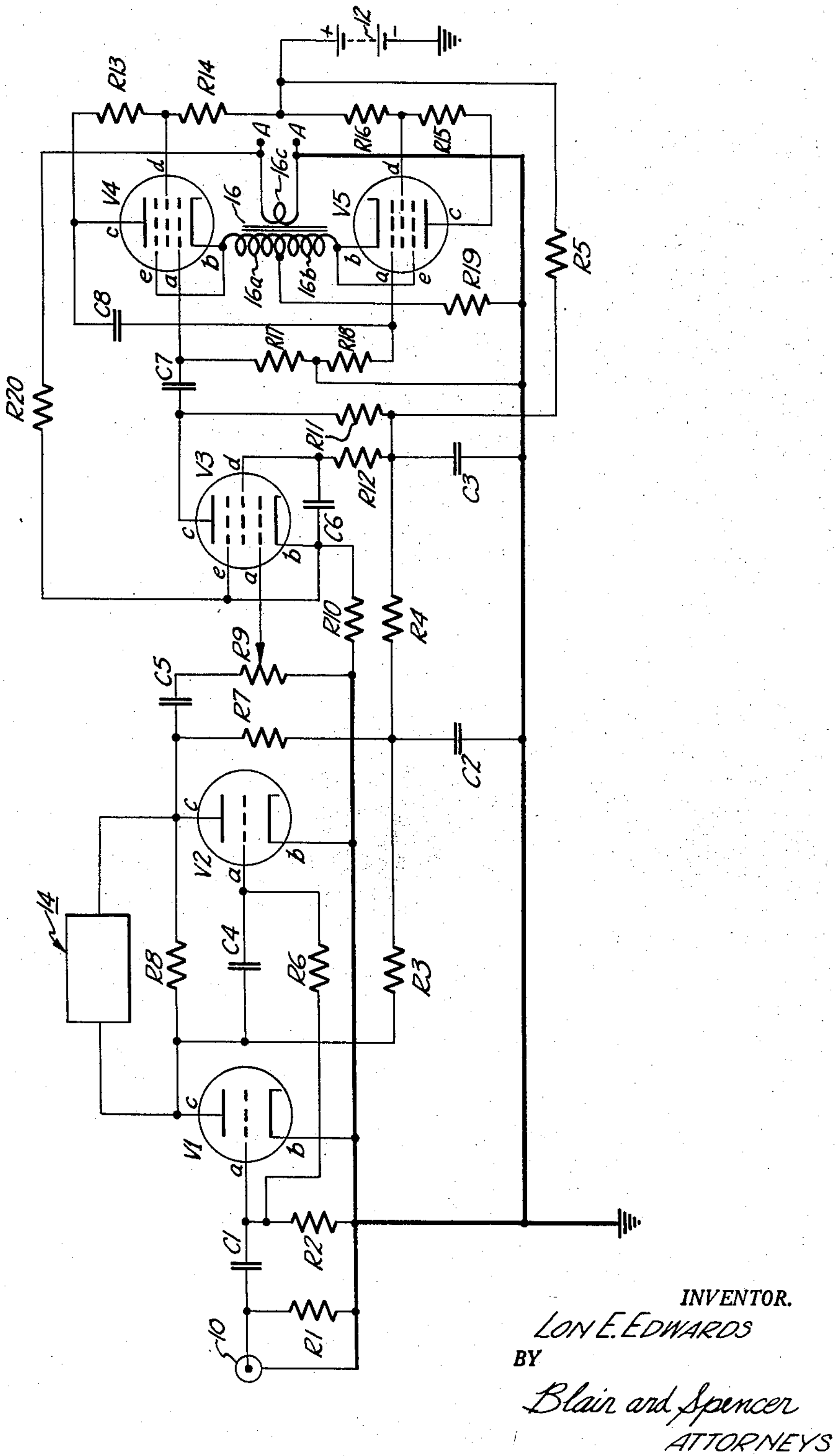
INVENTOR.
LON E. EDWARDS
BY
Blair and Spencer
ATTORNEYS 2,955,261

AUDIO AMPLIFIER

Lon E. Edwards, Mured Incorporated, Southern Blvd., Danbury, Conn.

Filed Dec. 3, 1956, Ser. No. 625,859

7 Claims. (Cl. 330—89)

This invention relates to a single unit audio amplifier for high-quality reproduction of phonograph records and the like. More particularly, it relates to a low-cost, high-quality audio amplifier containing a novel preamplifier and having a cathode follower output stage.

Amplifiers responding to frequencies in the audio range are of course most widely used in various equipments associated with the amplification and reproduction of sound. For example, such equipments are used in playing back phonograph records or amplifying received radio signals where the output of the amplifier is fed to a loud-speaker or similar device. They are also used in various scientific instruments, for example, to drive recording pens, etc. Amplifiers used in the reproduction of music closely approximating that from the original source are generally known as high-fidelity amplifiers. Since the faithfulness or fidelity of the sound from the loud-speaker is to a large degree subjective, various object criteria of amplifier performance measurable with instruments have been proposed. Thus, it is generally believed that, to provide high-quality reproduction, an audio amplifier should have low harmonic and intermodulation distortion, a frequency response extending beyond the range of human hearing, faithful response to a square wave input signal, etc. However, the ultimate test is still the subjective one of listening to the music played through a suitable loud-speaker arrangement.

Prior to my invention, high-fidelity amplifiers were relatively expensive as a result of the complexity of their circuitry and the quality required of the individual components. Almost without exception they required extensive feedback around several stages with a consequent tendency toward instability, even with careful design and high-quality components. Moreover, they were provided with output stages capable of delivering 10 to upwards of 50 or more watts of audio power, thus requiring power supplies capable of delivering several times that power. This resulted in heavy, cumbersome amplifiers, usually with power supplies on separate chassis, consuming large amounts of power and generating a large amount of heat for dissipation to the atmosphere.

Accordingly, it is an object of my invention to provide an improved amplifier whose output is a faithful reproduction of the input thereto. It is another object of my invention to provide an amplifier of the above character capable of operation in the region of audio frequencies. It is a further object of my invention to provide an audio amplifier of the above character capable of driving loud-speakers to provide faithful reproduction of sound as determined by the human ear. It is a still further object of my invention to provide an amplifier of the above character capable of driving various loads encountered with scientific instruments and the like. Another object of my invention is to provide an amplifier of the above character utilizing relatively simple circuitry, simple and inexpensive components and low feedback in any one feedback loop. It is yet another object of my invention to provide an amplifier of the above character whose operation is substantially unaffected by ordinary variations in load impedance. It is a further object of my invention to provide an amplifier of the above character which is simple in construction and which comprises relatively low cost components. A final stated object of my invention is to provide an amplifier of the above character which may be assembled with a minimum of labor. Other objects will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is a schematic diagram of the electrical circuit of my improved amplifier.

In general, the preferred embodiment of my amplifier is an all-electron tube arrangement having four stages of amplification, including a push-pull cathode follower output stage with phase inversion in the final stage. In addition to the feedback inherent in a cathode follower stage, three negative feedback loops are provided. One of these loops runs from the secondary of the output transformer to the cathode of the third or driver stage. Another is between the plate and grid circuits of the second stage, including, where desirable, RC equalization networks for the playback of phonograph records or the like. The third loop is around the first stage, running between the control grid of the second stage and that of the first stage. This latter feedback loop is incorporated in a novel "contact" biasing circuit in which the grid of the second stage is returned to ground through the grid resistor of the first stage. This eliminates the need for cathode resistors and capacitors, thereby reducing considerably the number of required components and allowing both cathodes to be connected directly to ground to eliminate hum pickup from the filaments of these tubes.

The prevailing opinion prior to my invention was that phase inversion in the output stage was undesirable because of increase in harmonic distortion. Likewise, the use of the cathode follower in this stage has been held to have serious drawbacks stemming from, among other things, the high voltage required to drive a push-pull cathode follower; it was thought that this required either a driver stage operating in non-linear regions of its characteristics or a step-up transformer input increasing component cost and having inherent distortion. I have found that by combining these two circuits both problems may be overcome. In the first place, with such an arrangement the driver stage need deliver only the grid-to-ground voltage of one of the output tubes, which is one-half the grid-to-grid voltage ordinarily required. The use of a cathode follower arrangement minimizes harmonic and other forms of distortion encountered in the output tubes, and the feedback loop around the output and driver stages reduces distortion in both of them. Sufficient feedback in this loop as well as in the other feedback loops may be had to minimize distortion throughout the amplifier without the serious instability problems inherent in loops including a greater number of stages.

In further refining my amplifier, I do not match the impedance of the output stage to that of the load. Rather, the output transformer is chosen to reflect back to the amplifier an impedance several times that of the load. By so doing I minimize the effect of variations in load impedance on amplifier operation. Damping of the speaker is improved by such a transformer ratio, as the impedance back into the output terminals is reduced to less than one ohm.

Turning now to the drawing, the input to my amplifier may be a conventional sheilded jack indicated at 10, the center conductor of which is coupled by a suitable capacitor C1 to the control grid V1*a* of a vacuum tube V1 in the first stage. A resistor R1 may be shunted across the input to provide a suitable load for a phonograph pickup or the like. The cathode V1*b* is connected directly to ground, and contact biasing is used to maintain the grid at the proper D.C. level. With this type of bias I prefer to use a triode for tube V1, one half of a type 12AX7 dual triode being satisfactory; and I have found that a grid resistor R2 of 4.7 megohms maintains the correct voltage when used with this type tube. A plate load resistor R3 of 270,000 ohms is connected to a suitable plate voltage supply, illustratively indicated by a battery 12 through a decoupling network comprising capacitors C2 and C3 and resistor R4 with a dropping resistor R5.

The output of triode V1 is coupled to the control grid V2*a* of a vacuum tube V2, preferably the other half of a type 12AX7 triode, through a suitable capacitor C4. The cathode V2*b* of tube V2 is connected directly to ground, the grid of this stage also deriving its bias from contact potential and being returned to ground through a 4.7 megohm resistor R6 in series with grid resistor R2 of the first stage. In this manner I provide inverse feedback around the first stage. In addition to feedback, this novel biasing arrangement provides tube V2 with a bias voltage substantially equal to its contact potential plus that of tube V1, substantially greater than that developed in either stage. Tube V2 may therefore effectively accommodate a greater input voltage than tube V1 before drawing grid current, and this is required because of the amplification of the input signal by tube V1. The plate voltage of tube V2 is supplied through a suitable plate load resistor R7 connected to the junction of capacitor C2 and resistor R4.

A resistor R8 having a value of approximately 4.7 megohms may be connected between the plates V1*c* and V2*c* of the first and second stages to provide inverse feedback around the second stage of the amplifier. In parallel with resistor R8 there may be connected a suitable frequency sensitive circuit such as an RC filter or the like for shaping the response of the amplifier to compensate for phonograph record equalization, etc. A plurality of such filters may be combined with a multiple contact switch to provide a variety of response curves suitable for use with records having different frequency chracteristics.

The output of tube V2 is coupled to the control grid V3*a* of the driver stage by a capacitor C5, a potentiometer R9 being connected in the usual manner for controlling the amplifier output voltage. The driver stage vacuum tube V3 should be capable of high output amplitude with minimum distortion in order to drive the cathode follower output stage; therefore, I prefer to use a tetrode or pentode, a type 6AU6 pentode being suitable. Tube V3 is connected in a conventional circuit having a cathode resistor R10, a plate load resistor R11 and a screen grid resistor R12. A capacitor C6 connected between the cathode V3*b* and the screen grid V3*c* effectively bypasses the screen for all frequencies within the pass band of the amplifier. Resistor R10, which has a value of 3900 ohms is preferably not bypassed, thereby extending the low frequency response of the stage and providing a measure of degeneration to reduce distortion from it. The suppressor grid V3*e* may be connected directly to the cathode. To provide the required output signal voltage, resistor R11 should be about .33 megohm and resistor R12 about .82 megohm. A type EF86 pentode may be substituted for the type 6AU6, in which case resistor R12 should be about 1.8 megohms.

The output of the driver stage is fed to the input of the final stage through a coupling capacitor C7 running between plate V3*d* and the control grid V4*a* of an output tube V4. Tube V4 is connected in a push-pull cathode follower circuit with a similar tube V5, the output being taken from the cathodes V4*b* and V5*b*. The input to tube V5 should be 180° out of phase with the input to tube V4, requiring phase inversion of the output of the driver stage. To accomplish this I have inserted a resistance comprising resistors R13 and R14 in the plate circuit of tube V4. Also, plate V4*c* is coupled to grid V5*a* through a capacitor C8. The plate signal voltage of tube V4 is of course opposite in phase to the grid voltage, and by suitable choice of resistors R13 and R14 it may be made of equal amplitude thereto to provide the correct input signal at the grid V5*a*. Tubes V4 and V5 may be type EL84 pentodes, manufactured by Amperex Electronic Corporation, in which case suitable operation may be obtained when the series combination of resistors R13 and R14 totals approximately 4000 ohms. Since this resistance in the plate circuit of tube V4 affects the output voltage at the cathode V4*b*, similar resistors R15 and R16 should be inserted in series with plate V5*c* to equalize the voltage at the cathode V5*b*. Resistors R14 and R16 are connected to the power supply 12, and the desired voltages for the screen grids V4*d* and V5*d* may be obtained at the junctions of resistors R13 and R14 and R15 and R16, respectively. For such operation, resistors R13 and R15 should be approximately 2200 ohms, and resistors R14 and R16 1800 ohms. The grids V4*a* and V5*a* are returned to ground through matched resistors R17 and R18 having values of approximately .68 megohm each. Other suitable vacuum tubes such as type 12BH7 triodes (in push-pull parallel) and type 12A4 triodes may be used as tubes V4 and V5.

The output from the cathodes of tubes V4 and V5 is coupled to the load by a transformer 16 having a center tapped primary with windings 16*a* and 16*b*. The center tap may be returned to ground through a 100 ohm resistor R19 to provide bias for these tubes. The secondary winding 16*c* of the transformer has output terminals A—A for connection to the load, one of the terminals being grounded and the other being connected through a resistor R20 to the cathode of tube V3 to provide inverse feedback around both the output and driver stages. Resistor R20 may be 10,000 ohms when used with the tube types and cathode resistance disclosed above for tubes V3, V4, and V5 and resistor R10.

It will be apparent that by using the above-described method of phase inversion in which only the grid-to-ground signal voltage, i.e. one half the grid-to-grid voltage, of the final stage need be supplied by the driver stage, my amplifier requires only a single-ended driver stage with consequent saving of components and labor. A conventional split load phase inverter in which an output of one polarity is taken from the plate and an output of opposite polarity is taken from the cathode will of course not function in the driver stage of an amplifier having a cathode follower output, for it will not supply the high voltages necessary in such application. The inverse feedback loop through resistor R20, together with the large amount of degeneration resulting from cathode follower operation, minimizes the harmonic distortion problem thought by many to be inherent in the use of this type of phase inversion in the final stage. It will also be apparent that the combination of these two circuit arrangements, i.e. push-pull cathode follower output stage with phase inversion in the final stage, provides a self-balancing feature to further reduce distortion. More particularly, the effects of changes in load impedance or in the plate amplification of tube V4 in causing unbalance are largely canceled out by inductive coupling from primary winding 16*b* to winding 16*a*. In this manner the unbalance voltage so generated is inserted between the cathode and control grid of tube V4 and in the proper phase to correct the plate signal thereat. This effect may be enhanced by use of the impedance matching ratios of transformer 16 to be presently described.

I prefer not to match the output impedance of tubes V4 and V5 to the load; rather, I use an output transformer 16 which presents a substantially greater-than-matching impedance to the amplifier. More particularly, I have found that a mismatch of 30–1, presenting an impedance of approximately 6600 ohms to cathodes V4*b* and V5*b* with a 16 ohm load connected across the output terminals A—A is preferable for energizing a loud-speaker or like load. A 10–1 mismatch is suitable in most other applications. In combination with the inverse feedback around the last two stages and in the cathode follower, such mismatching presents a very low impedance to the load, i.e. on the order of .3 ohm; thus, the amplifier behaves substantially as an ideal constant voltage source, and as such its operation is essentially unaffected by variations in load impedance, and loads of various types, ranging from loud-speakers to scientific instruments, may be connected to the output terminals A—A singly or in parallel without materially altering the output voltage. The low impedance looking back into the amplifier is of particular utility where damping of an electromechanical load such as a loud-speaker is desirable; and in fact I am of the opinion that the faithfulness of sound reproduction is in large part due to this feature.

The supply voltage required from power supply 12 is not too critical; it may range anywhere from 300 to 360 volts for the output tubes described above. In this voltage range suitable operation is obtained when the decoupling resistor R4 and the dropping resistor R5 have values of 3300 ohms and 3900 ohms, respectively. A conventional filament transformer may be used to provide heater current to the various tubes in the amplifier. A hum reducing filament rectifier is unnecessary for the low level first and second stages because of the direct cathode-to-ground connections.

The output power available from the amplifier described above is from one to three watts, depending on the type of output tube selected, and this is more than sufficient for home and even many auditorium installations. The published ratings on many of the prior art amplifiers describe various tests made with power outputs of upwards of ten to twenty watts. Evidently these amplifiers were designed in the belief that, if distortion is low at high power, it will be negligible at the lower listening levels. My low power amplifier, however, has inaudible distortion at listening levels, and furthermore, the quality of the sound reproduced by it is considerably better than that of most of the prior art amplifiers having lower published distortion figures. This may be in large part due to the excellent load damping characteristics I have provided, which are relatively independent of such other characteristics as frequency response and harmonic as well as intermodulation distortion. Prior to my invention substantial reductions in output impedance were obtained from the unstable combination of positive and negative feedback. Moreover, it will be readily apparent that such a low power amplifier requires fewer and smaller components, weighs less, consumes considerably less power, and generates less heat.

Thus I have described a compact single unit amplifier particularly adapted to the reproduction of sound. The amplifier provides faithful reproduction of its input signal and yet may be constructed with a minimum of parts, and corresponding reduction in cost. A novel biasing arrangement in the first two stages provides feedback for the input stage and permits direct ground connection of the cathodes thereof to minimize filament hum. Additional feedback is provided by a loop around the second stage, an unbypassed cathode resistance in the driver stage, a feedback loop around the output and driver stages, and by use of a cathode follower output stage. By use of phase inversion in the final stage, I am able to use a single ended driver, with additional saving. The cathode follower output stage combines with the above described mismatching of the output transformer and the feedback loop around the last two stages to provide low output impedance and a large degree of load damping.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A vacuum tube power amplifier connected in a push-pull circuit and adapted to be excited from a single-ended signal source comprising, in combination, a first electron tube and a second electron tube, each of said tubes having a cathode, a control grid, and a plate, the control grid of said first tube being coupled to said signal source, a resistance connected in the plate circuit of said first tube, means coupling the plate of said first tube to the grid of said second tube, whereby there is applied to the grid of said second tube a voltage of substantially equal amplitude and substantially opposite phase from that applied to the grid of said first tube, and a transformer having a first winding connected to carry the cathode current of said first tube and a second winding connected to carry the cathode current of said second tube, whereby current through each of said windings induces a voltage in the grid-cathode circuit of the tube connected to the other of said windings.

2. The combination defined in claim 1, including a resistance connected in the plate circuit of said second tube substantially equal in value to said resistance in the plate circuit of said first tube.

3. The combination defined in claim 1 in which said transformer has a third winding for connection to a load and is adapted to present to said cathodes an impedance in excess of ten times the matching impedance for said cathodes.

4. The combination defined in claim 3 in which said transformer is adapted to present to said cathodes an impedance substantially thirty times the matching impedance for said cathodes.

5. The combination defined in claim 3 in which said first and second tubes are type EL84 and in which said transformer is adapted to present to said cathodes an impedance of substantially 6600 ohms when a load of 16 ohms is connected to said third winding thereof.

6. In a vacuum tube power amplifier, the combination of a first stage having a first vacuum tube connected for single-ended operation and a second stage having a second and third vacuum tube connected for push-pull operation, each of said vacuum tubes having a control grid, a cathode, and a plate, means coupling the plate of said first tube to the grid of said second tube, a resistor connected in the plate circuit of said second tube, means coupling the plate of said second tube to the control grid of said third tube, whereby the signal voltage on said control grid of said third tube is substantially equal in magnitude to and opposite in phase from that applied to the control grid of said second tube, an output transformer having a primary winding and a secondary winding, said primary winding being connected between the cathodes of said second and third tubes whereby said second stage is adapted for cathode follower operation, thereby to reduce the distortion and output impedance of said second stage, and means coupling said secondary winding to the cathode of said first stage, whereby there is fed back to the input of said first stage a signal substantially opposite in phase to the input signal of said amplifier, thereby to reduce the distortion and output impedance of said amplifier.

7. In a vacuum tube power amplifier, the combination of a first stage having a first vacuum tube connected for single-ended operation and an output stage having second and third vacuum tubes connected for push-pull cathode follower operation, each of said vacuum tubes having a control grid, a cathode and a plate, means coupling the output of said first tube to the grid of said second tube, a plate power supply, plate load resistances of substantially equal value connected between the plates of said second and third tubes and said power supply, a capacitor connected between the plate of said second tube and the grid of said third tube, said capacitor and plate load resistors being of such value as to apply to said grid of said third tube a voltage substantially equal in magnitude to and opposite in phase from that applied to said control grid of said second tube, and an output transformer having a primary winding and a secondary winding, said primary winding being connected between the cathodes of said second and third tubes, said primary winding having a center tap connected to said power supply by a common cathode biasing resistor.

References Cited in the file of this patent

UNITED STATES PATENTS

| | | |
|---|---|---|
| Re. 24,204 | Coulter | Aug. 28, 1956 |
| 2,350,858 | Worcester | June 6, 1944 |
| 2,751,442 | Ketchledge | June 19, 1956 |
| 2,760,009 | De Boer et al. | Aug. 21, 1956 |

FOREIGN PATENTS

| | | |
|---|---|---|
| 587,155 | Great Britain | Apr. 16, 1947 |

OTHER REFERENCES

Cogan: "A Linear Recording Meter," an article in the Dow Chemical Company Engineering Dept. publication, May 1949, pages 8, 9, 28.

Article, "New British Power Amplifier," Radio and Television News, March 1955, pages 45–47, 132.

Article, "Circuit Design Factors for Audio Amplifiers," Electronics, April 1955, pages 166–171.

Gilson et al.: "A Practical . . . Amplifier," Audio Engineering, May 1949, pages 9, 10, 32, 33, 34.

Johnston: "A Cathode-Follower Amplifier," Radio and Television News, October 1955, pages 124–125.

Langford-Smith: "Radiotron Designer's Handbook," April 1953 (fourth edition), page 881.

Woods: "Improving . . . Response," Electronics, August 1955, pages 190, 192, 194, 196, 198.